(No Model.) 2 Sheets—Sheet 1.

J. CLENCH.
DEVICE FOR SIFTING COAL ASHES.

No. 579,358. Patented Mar. 23, 1897.

WITNESSES:
E. B. Bolton
Otto Mintz

INVENTOR
Johnson Clench
BY
ATTORNEYS (No Model.) 2 Sheets—Sheet 2.

J. CLENCH.
DEVICE FOR SIFTING COAL ASHES.

No. 579,358. Patented Mar. 23, 1897.

WITNESSES:
E. B. Bolton
Otto Munk

INVENTOR
Johnson Clench
BY
Richardson
ATTORNEYS

UNITED STATES PATENT OFFICE.

JOHNSON CLENCH, OF ST. CATHARINES, CANADA.

DEVICE FOR SIFTING COAL-ASHES.

SPECIFICATION forming part of Letters Patent No. 579,358, dated March 23, 1897.

Application filed June 23, 1896. Serial No. 596,647. (No model.) Patented in Canada February 14, 1896, No. 51,322.

*To all whom it may concern:*

Be it known that I, JOHNSON CLENCH, a citizen of the Dominion of Canada, and a subject of the Queen of Great Britain and Ireland, residing at the city of St. Catharines, in the county of Lincoln and Province of Ontario, Canada, have invented certain new and useful Improvements in Devices for Sifting Coal-Ashes, (for which I received a patent in Canada February 14, 1896, No. 51,322,) of which the following is a specification, such as will enable those skilled in the art to which it pertains to make and use the same.

The invention is fully disclosed in the following specification, of which the accompanying drawings form a part, in which similar numerals of reference designate like or equivalent parts wherever found throughout the several views, and in which—

Figure 1:
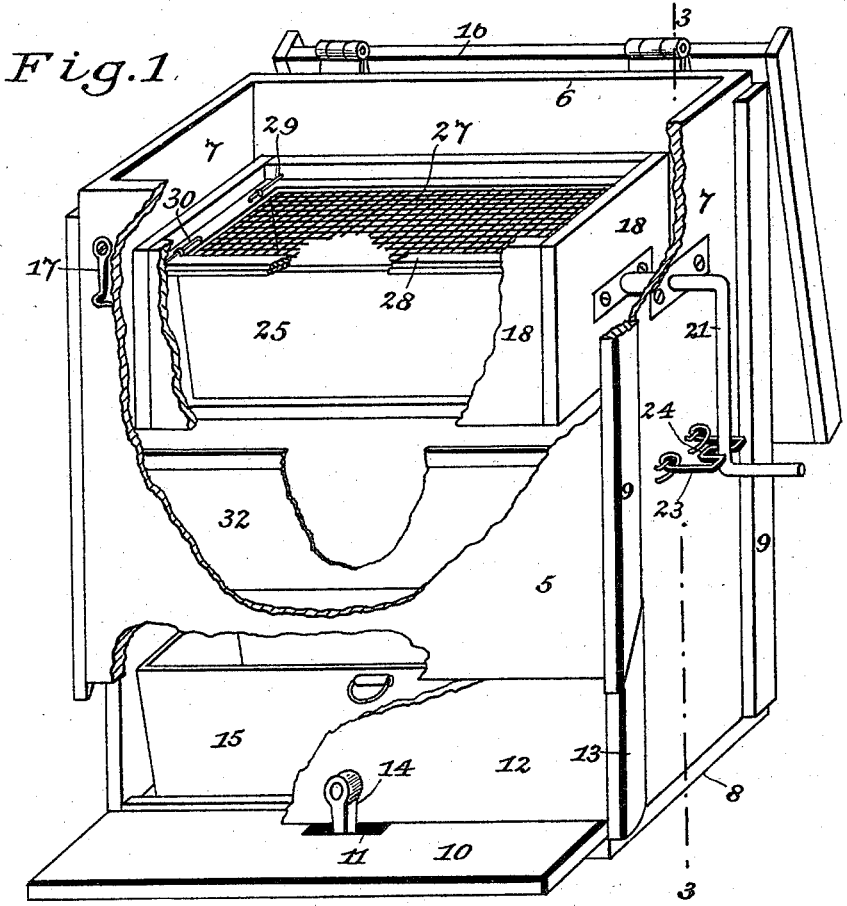
Figure 4:
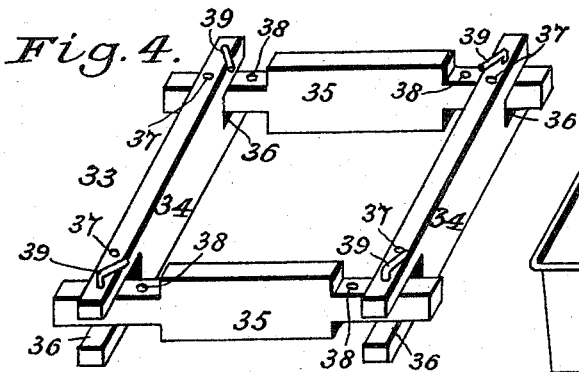
Figure 2:
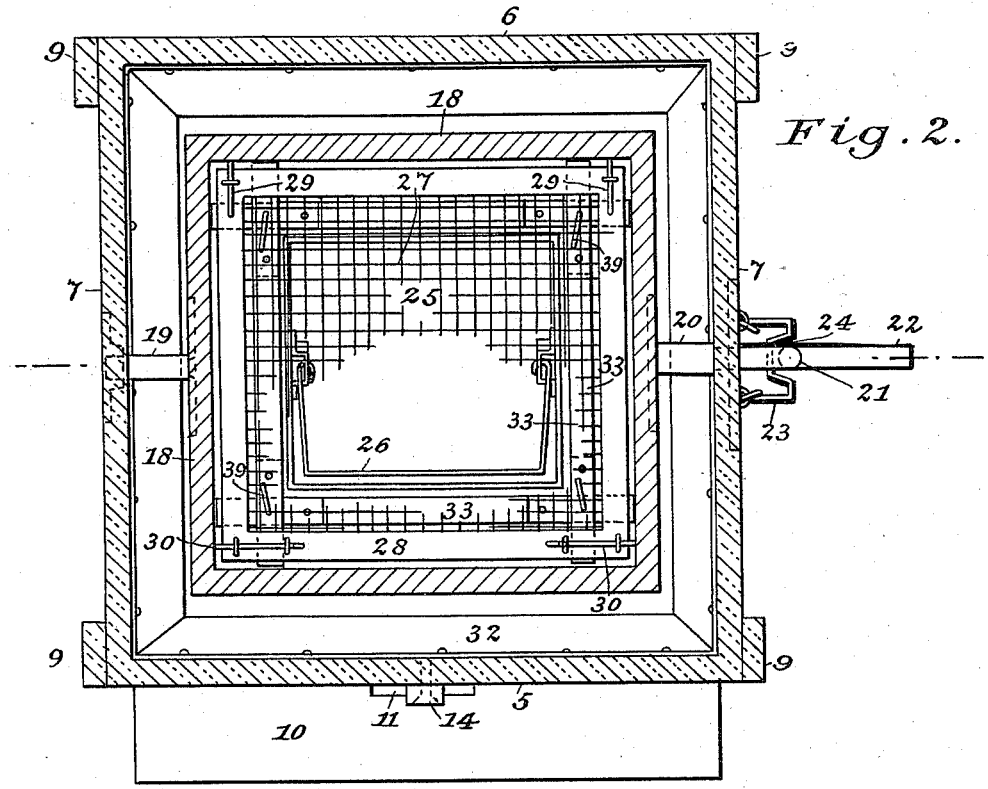
Figure 3:
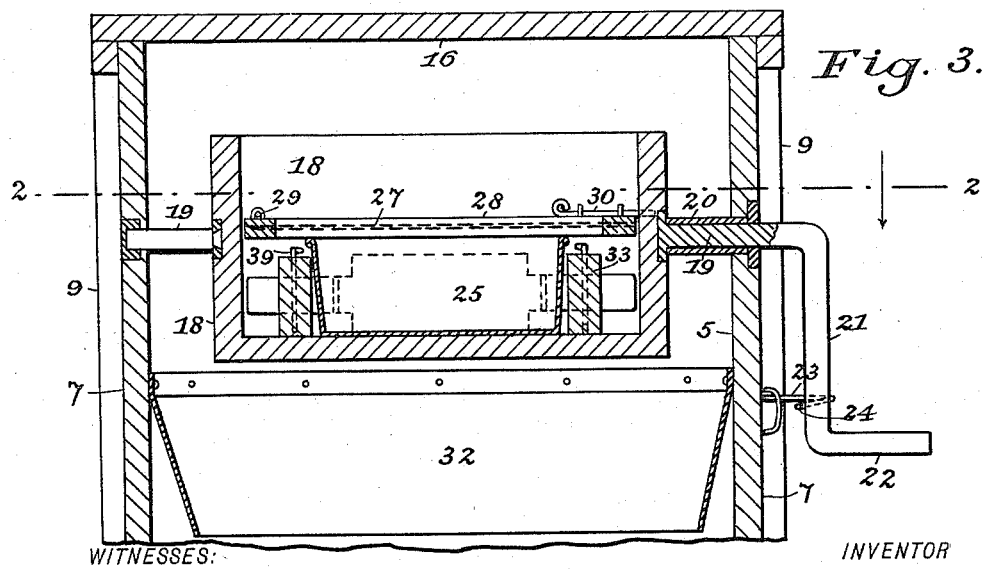

Figure 1 is a perspective view of my improved apparatus for sifting ashes, part of the construction being broken away, so as to better show the interior arrangement thereof. Fig. 2 is a section on the line 2 2 of Fig. 3; Fig. 3, a partial section on the line 3 3 of Fig. 1; Fig. 4, a perspective view of the frame which I employ; and Fig. 5 a perspective view of the ash-pan, which also forms a part of the apparatus.

In the practice of my invention I provide a box or casing which consists of a rectangular box which is preferably square in cross-section and which consists of the front 5, a back 6, ends 7, and a suitable bottom 8, and the ends are also preferably provided with vertical strips 9, which give strength and stability thereto.

The lower part of the front is preferably provided with a projecting shelf 10, in which is formed, centrally thereof, a slot 11, and I also provide a removable door 12, having end pieces 13, similar to the vertical strips 9, which are secured to the ends of the casing, and the door 12 is adapted to be slid into position or removed whenever desired, and pivotally connected therewith is an arm 14, which is adapted to be swung downwardly into the slot 11 to hold the door 12 in place. I also provide a removable drawer 15, which is adapted to be inserted into the box or casing or removed therefrom when the door 12 is removed, and said drawer 15 is designed to receive the ashes which pass through or from the sifter, as hereinafter described. The box or casing is also provided with a hinged cover 16, and connected with the front thereof are hooks 17, which are adapted to hold said cover in a closed position, and I also provide an angular sifting-box 18, which is of the same general form as the main box or casing, and said sifting-box is provided at its ends with tenons or journals 19, each of which is mounted in the ends of the main box or casing and one of which passes through a tubular bearing 20 and is provided with a crank 21, having a handle 22, and secured to the side of the box or casing below the crank 21 is a spring-catch 23, provided with an inwardly-directed yoke or loop 24, and said spring-catch 23 is adapted to be folded adjacent to the box or casing or to be raised into the extended position, as shown in Figs. 1 and 2, in which position it is designed to hold the crank 21 stationary.

Figure 5:
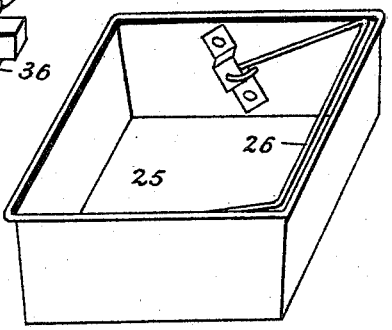

The sifting-box 18 is open at the top and is designed to receive the ash-pan from a stove or furnace, one of said pans being shown at 25 in Fig. 1 and another being shown at 25 in Fig. 5, and said ash-pan is provided with a bail 26, and in practice I provide a screen 27, which consists of a suitable angular frame 28 and a body portion of wire mesh or similar material, and the screen 27 is adapted to be secured in the upper portion of the sifting-box 18 and over the ash-pan, when the latter is placed therein, by means of pins or projections 29, which are rigidly secured to the ends of the frame 28 of the screen and adapted to enter corresponding holes formed in the adjacent sides of the sifting-box, while the said frame 28 of the screen is provided at its opposite corners with sliding pins 30, which are adapted to enter corresponding holes or openings formed in the adjacent side of the sifting-box 18. By this means, as will be understood, the screen 27 will be securely held in the sifting-box 18 and the ash-pan 25 will also be securely held therein, and said sifting-box may be turned over without displacing said pan or said screen.

In practice the ash-pan is taken from the stove or furnace and placed in the sifting-box, after which the screen is secured thereover, as herein described. The top or cover 16 of the main box or casing is then closed and fastened, and the spring fastening device 23 is disconnected from the crank 21, and the sifting-box is revolved by the crank until the handle thereof is in its uppermost position, in which position the screen 27 will be directed downwardly, and the crank is then oscillated or agitated from right to left, or vice versa, so as to thoroughly shake and agitate the sifting-box, and in this operation the ashes pass through the screen into the sliding or removable drawer 15, after which the crank 21 and the sifting-box are turned into the position shown in Fig. 1, when the pan 25 may be removed, and it will be understood that all the charred coal, cinders, and unburned coal will remain in the pan 25.

Placed immediately above the removable drawer or pan 15 is an inwardly and downwardly inclined deflector 32, which extends entirely around the main box or casing and which is designed to direct all the ashes or other substance that pass from the sifter into the drawer or pan 15, and this deflector may be composed of any desired material and may be secured in place in any desired manner. I also provide an adjustable frame 33, (shown in Fig. 4,) and which is adapted to be placed in the bottom of the sifter-box 18. This frame is made adjustable, whereby ash-pans of different sizes may be firmly held against displacement within the sifting-box, and this frame consists of side bars 34 and end bars 35, which are adjustably mounted in longitudinal slots 36, formed in the ends of the side bars, and said side bars or the ends thereof are provided with vertical openings or passages 37 and the end bars with similar openings or passages 38, through which pass pins 39, and by means of this construction the size of the frame 33 may be adjusted, and a pan 25, much smaller than that shown in Fig. 1, may be placed in said frame after said frame has been placed in the sifter-box, and when the said frame and the pan have thus been placed in position the screen 27 may be secured thereover, as hereinbefore described.

By means of this construction I accommodate the sifter to ash-pans of different sizes, as will be readily understood, and it will be apparent that the frame 33 may or may not be employed, it being only necessary when the ash-pan to be placed in the sifter is much smaller than the said sifter.

It will thus be seen that I accomplish the object of my invention by a device which is simple in construction and operation and which is well adapted to produce the result for which it is intended, and it is evident that changes in and modifications of all the constructions herein described may be made without departing from the spirit of my invention or sacrificing its advantages.

Having now fully described my invention, I claim as new and desire to secure by Letters Patent—

1. In an ash-sifter, the combination with the sifting-box, the clamping-frame fitting within said box, said frame comprising adjustable side and end walls, whereby ash-pans of various sizes may be firmly held against displacement, substantially as described.

2. In an ash-sifter, the combination with the sifter-box, of the frame consisting of side and end bars having lengths corresponding to the clear length and breadth of the interior of said box and formed with tongues and slots, and means for relative adjustment whereby ash-pans of different sizes may be firmly held against displacement within the sifting-box.

In witness whereof I have hereunto set my hand in presence of two witnesses.

JOHNSON CLENCH.

Witnesses:
V. H. CONNOR,
IRA L. CULP.